July 8, 1930.                    J. L. PRICE                    1,770,109
                                 BRAKE DRUM
                              Filed Feb. 15, 1926

INVENTOR
JACOB L. PRICE
BY
M. W. McConkey
ATTORNEY

Patented July 8, 1930

1,770,109

UNITED STATES PATENT OFFICE

JACOB L. PRICE, OF CHICAGO, ILLINOIS, ASSIGNOR TO BENDIX BRAKE COMPANY, OF CHICAGO, ILLINOIS, A CORPORATION OF ILLINOIS

BRAKE DRUM

Application filed February 15, 1926. Serial No. 88,191.

This invention relates to brake drums, and is illustrated as embodied in two different brake drums for automobile wheels. An object of the invention is to form the drum with a narrow arcuate slot, or other opening, permitting the use in adjusting the brakes of a feeler placed flat against the inside of the braking flange. Preferably the outer edge of the opening is in alinement with the inner surface of the braking flange, or at least is not inside of that surface. The opening may be covered, if desired, and in one arrangement in which the drum is used as part of the wheel, the outer wheel part is used to cover the opening.

The above and other objects and features of the invention will be apparent from the following description of two illustrative embodiments shown in the accompanying drawings, in which.

Figure 1:
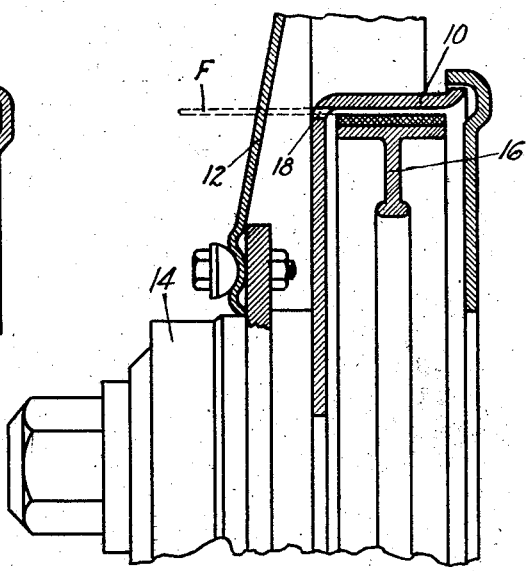
Fig. 1 is a radial section through one-half of the brake, and through part of the wheel, in an arrangement in which the drum and wheel are separately secured to the hub.

The arrangement in Fig. 1 includes a drum 10 and a disk wheel 12, separately secured to a hub 14. Brake shoes 16 are arranged inside drum 10 in any desired manner.

According to the present invention, the head of drum 10, just inside the cylindrical braking flange, is formed with an opening, such as a narrow arcuate slot 18, for a feeler "F", which can be inserted from the outside after wheel 12 is removed, to serve as a gage against which shoes 16 are adjusted when in released or idle position, to predetermine the clearance of the shoes. Preferably the outer edge of slot 18 is in alinement with the inside of the braking flange, but at least it should not be inside the inner surface of that flange, as it is desired that feeler "F" lie flat against the flange. If desired, a suitable cover may be fastened over slot 18.

Figure 2:
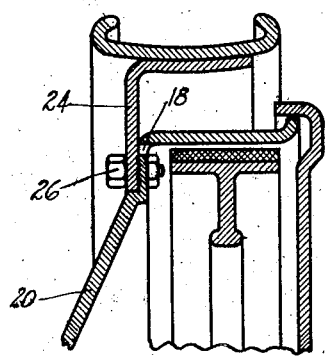
Fig. 2 is a partial radial section, corresponding in a general way to Fig. 1, showing an arrangement in which the drum forms part of the wheel.
Figure 3:
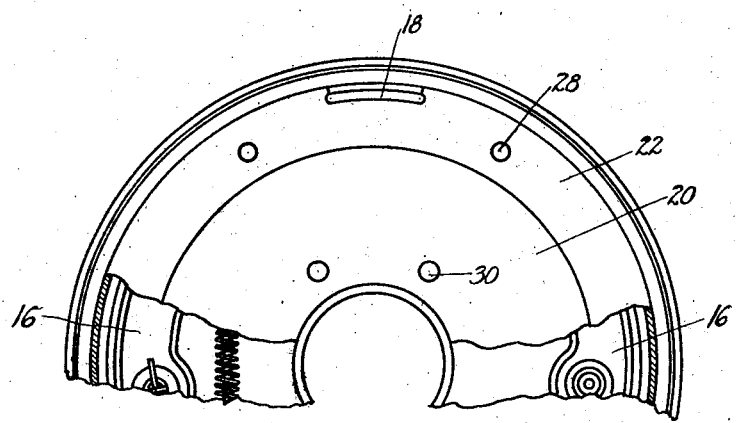
Fig. 3 is a partial side elevation of the drum of Fig. 2, partly broken away to show the brake shoes within it.

In Figs. 2 and 3 is shown an arrangement in which the drum 20 serves as the major part of the wheel, this being especially desirable with balloon tires. The head of the drum is rabbeted at 22 to form a recess receiving the edge of an outer rim-carrying wheel part 24 demountably secured by bolts or other fastenings 26 passing through openings 28. Drum 20 may have a hub drawn integrally at its center, or it may be secured to a separate hub 14 by fastenings passing through openings 30. Wheel part 24 thus has the additional function in this arrangement of serving as a cover for the opening or slot 18.

While two illustrative embodiments have been described in detail, it is not my intention to limit the scope of the invention to those particular embodiments, or otherwise than by the terms of the appended claim.

I claim:

A brake construction comprising a brake drum having a head portion and a braking flange, a braking element positioned in said drum and adapted to engage with the interior of said flange, said drum having a slot formed in the head at a point where the head and flange of the drum meet, said slot being so arranged that a feeler may be inserted to determine the clearance between the interior of the braking flange and the braking element; an annular wheel member detachably secured to the drum in such position as to cover said slot when the wheel member is in place.

In testimony whereof, I have hereunto signed my name.

JACOB L. PRICE.